United States Patent Office 3,234,273
Patented Feb. 8, 1966

3,234,273
PREPARATION OF TRIMERIC AND TETRAMERIC SUBSTITUTED PHOSPHONITRILES
Rip G. Rice and Bernard Grushkin, Silver Spring, and John T. Ament, Baltimore, Md., assignors to W. R. Grace & Co., New York, N.Y., a corporation of Connecticut
No Drawing. Filed Aug. 28, 1963, Ser. No. 305,211
4 Claims. (Cl. 260—543)

The present invention relates to the production of phosphonitriles, and more specifically to a novel process by which good yields of 2,4,6-trichloro - 2,4,6 - triphenyltriphosphonitriles and 2,4,6,8 - tetrachloro - 2,4,6,8 - tetraphenyltetraphosphonitriles may be conveniently and economically obtained.

The trimeric and tetrameric phosphonitriles, cis and trans-2,4,6-trichloro-2,4,6 - triphenyl and 2,4,6,8 - tetrachloro-2,4,6,8-tetraphenyltetraphosphonitriles having the general formulae

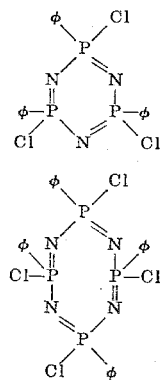

wherein $\phi$ represents phenyl, are valuable inorganic polymer intermediates. These compounds when first ammoniated by direct contact with ammonia and then condensed at temperatures above about 200° C. form highly crosslinked thermally stable polymers. These polymers may be defined as repeating phenyl substituted tri and tetra phosphonitrilic amido units bonded through amido nitrogen atoms. The polymers possess a high degree of thermal stability and find use in high temperature applications.

It has been shown in the prior art that the above trimeric and tetrameric compounds may be prepared by reacting phenyl tetrachlorophosphorane ($\phi PCl_4$) with ammonium chloride ($NH_4Cl$) in the presence of symmetrical tetrachloroethane (STCE). Prior workers have long thought that STCE possesses unique properties which makes it a preferred solvent for conducting reactions involving the synthesis of phosphonitrilic compounds. It was reasoned that its semi-polar nature, its ability to solubilize $\phi PCl_4$, its chemical inertness toward $\phi PCl_4$ and the phosphonitrilic products of the reaction, provides a condition required for formation of —P=N— type linkages. However, our study has shown that difficulty is encountered with the use of STCE as a reaction solvent for $\phi PCl_4$ and $NH_4Cl$ in that STCE undergoes dehydrohalogenation under the conditions of the reaction. The evolution of excess hydrogen chloride interferes with the determination of the end point of the reaction as measured by titration of HCl evolved during the formation of the desired trimer and tetramer. Furthermore, the residues of the STCE which are formed during the splitting off of HCl apparently interfere with the desired chemical reaction by reacting with the phosphonitrilic intermediates, thus suppressing the formation of the desired trimers and tetramers.

It is therefore an object of the present invention to provide an improved method for producing 2,4,6-trichloro-2,4,6-triphenyltriphosphonitriles and 2,4,6,8-tetrachloro-2,4,6,8-tetraphenyltetraphosphonitriles.

It is another object to provide a reaction solvent which does not undergo dehydrohalogenation when used in conjunction with $\phi PCl_4$ and $NH_4Cl$ to produce trimeric and tetrameric phenyl substituted phosphonitriles.

It is a further object to provide an improved method for reacting $\phi PCl_4$ and $NH_4Cl$ whereby superior yields of trimeric and tetrameric phenyl substituted phosphonitriles may be readily obtained.

These and still further objects of the present invention will become readily apparent to one skilled in the art from the detailed description and specific examples.

Broadly, the present invention contemplates a method for preparing 2,4,6-trichloro-2,4,6-triphenyltriphosphonitriles and 2,4,6,8-tetrachloro-2,4,6,8-tetraphenyltetraphosphonitriles which comprises reacting $\phi PCl_4$ and $NH_4Cl$ in the presence of a reaction medium selected from the group consisting of halo substituted benzenes and $C_6$ to $C_{10}$ alkanes.

More specifically, we have found that if $\phi PCl_4$ is reacted with $NH_4Cl$ in the presence of a compound having a formula

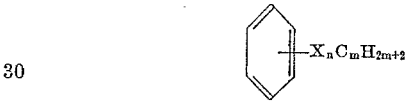

wherein X represents halogen, $n$ equals 1 to 3 and $m$ equals 6 to 10 at a temperature at from about 60° to about 150° C., good yields of 2,4,6-trichloro-2,4,6-triphenyltriphosphonitriles and 2,4,6,8 - tetrachloro - 2,4,6,8-tetraphenyltetraphosphonitriles may be readily obtained without dehydrohalogenation of the reaction medium occurring. The above mentioned solvents possess the feature of being truly inert to the conditions of the chemical reaction. This is not the case with the solvents used in the prior art. Furthermore, the above solvents, when compared to prior art halogenated solvents appear to enhance the reaction between $\phi PCl_4$ and $NH_4Cl$ to produce superior yields of the desired trimers and tetramers.

The $\phi PCl_4$ used in the practice of the present invention may be conveniently obtained by chlorinating $\phi PCl_2$ with gaseous chlorine in the presence of one of the above stated solvents. Generally, the chlorination reaction is conducted at ambient temperature, and addition of chlorine is continued until the reaction mixture turns yellow, indicating the presence of excess chlorine. This excess is removed by a nitrogen sweep. Generally speaking, from about 0.5 to about 4.0 moles of $\phi PCl_4$ are prepared per liter of solvent present. This $\phi PCl_4$ may then be subsequently used in the reaction with $NH_4Cl$ without prior separation or further treatment.

The ammonium chloride used in the practice of the present invention may be in a conventional granular state as obtained commercially, but more preferably should be in a finely divided condition. It is found that the rate of reaction of $\phi PCl_4$ is considerably increased if the ammonium chloride used has an average particle size of less than about 10 microns. A preferred method for preparing this extremely fine sized ammonium chloride involves passing converging streams of gaseous HCl and gaseous ammonia into an inert solvent. The particles of ammonium chloride which form in the inert solvent are in an extremely fine particulate state, the individual particles of which are frequently in the sub-micron size range. This very finely divided ammonium chloride offers an extremely large surface area over which the reaction with $\phi PCl_4$ may take place. While the preferred embodiment of the present invention utilizes extremely finely divided ammonium chloride such as produced by the converging streams of HCl and ammonia gases, it is to be understood that commercially available granular ammonium chloride, which may be mechanically reduced in size from grinding, may also be used with the novel reaction solvents set forth herein.

As stated above, the reaction solvents used in the practice of the present invention possess the general formula

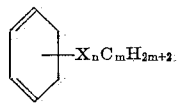

wherein X represents halogen, $n$ is an integer of from 1 to 3 and $m$ is an integer of from 6 to 10. Specific examples of halogenated benzenes which may be used are chlorobenzene, bromobenzene, dichlorobenzene and trichlorobenzene. Specific examples of alkanes which may be used are heptane, octane, hexane, and isooctanes.

A preferred procedure involving the use of the present solvents involves first dispersing at least 2 fold molar excess of ammonium chloride per mole of $\phi PCl_4$ to be used per liter of the selected reaction solvent by vigorous agitation. The ammonium chloride-solvent dispersion is heated to a reaction temperature of from about 60 to about 150° C. Subsequently, while continuing the vigorous agitation a prepared solution of $\phi PCl_4$ containing from about 0.2 to about 1.0 moles of $\phi PCl_4$ per liter of solvent similar to that used to disperse the ammonium chloride is added to the ammonium chloride-solvent dispersion. As mentioned above, the $\phi PCl_4$-solvent solution may be conveniently prepared by addition of chlorine to $\phi PCl_2$ dissolved in the solvent. The rate at which the $\phi PCl_4$ solution is added to the ammonium chloride dispersion depends on the nature of the reaction products desired. When it is desired to enhance the formation of trimeric materials, a very slow addition rate is employed. This rate of addition such that the concentration of $\phi PCl_4$ does not exceed about $10^{-4}$ moles per liter of reaction mixture at any given time. On the other hand, if tetramer formation is preferred a more rapid rate of $\phi PCl_4$ addition may be used. Still further, when the present novel solvents are utilized, good yields of both trimers and tetramers may be obtained if all the $\phi PCl_4$ is added to the ammonium chloride dispersion at room temperature, then the mixture is heated at the reaction temperature until the theoretical amount of HCl has been evolved.

Using the temperatures specified above it is found that the reaction of $\phi PCl_4$ with ammonium chloride is practically instantaneous when a moderately slow rate of addition is used. However, to insure complete reaction of the $\phi PCl_4$ it is usual to maintain the reaction mixture at a reaction temperature for a period of from about 30 to about 60 minutes subsequent to the addition of the $\phi PCl_4$ solution.

Subsequent to reaction of the $\phi PCl_4$ with ammonium chloride to yield the desired trimer and tetramer reaction product the trimers and tetramers may be conveniently recovered from the reaction mixture by first combining the reaction mixture with water and subjecting the mixture to vigorous physical agitation. This treatment with water serves to hydrolyze any linear phosphonitrilic products which may be formed during the reaction. Furthermore, the water hydrolyzes any excess $\phi PCl_4$ to phenylphosphonic acid and also dissolves excess ammonium chloride which is present. Subsequent to treatment with water the trimers and tetramers are easily separated from the reaction by separating the organic phase, then evaporating the solvent. Alternatively, when linears are not present, ammonium chloride may be removed by simple filtration without treatment with water.

Subsequent to separation from the reaction mixture, the trimers may be separated from the tetramers by extraction with pentene or hexane which are preferred solvents for the trimer. Still further separation of the trimeric isomers may be achieved by forming the benzene adduct of the cis trimer isomer by combination with benzene. Upon crystallization from benzene the 1:1 benzene adduct of the cis isomer is the first product to precipitate and may be recovered by a simple filtration. The trans isomer is then recovered from the filtrate by evaporation.

Having described the basic elements of the present invention the following detailed specific examples are given to illustrate embodiments thereof.

Example I

In this example $\phi PCl_4$ was reacted with ammonium chloride using symmetrical tetrachloroethane as the reaction solvent. A solution of 1.05 moles of $\phi PCl_2$ in 500 ml. of symmetrical tetrachloroethane was chlorinated slowly until the solution turned yellow. The $N_2$ gas was passed through the mixture to remove the excess chlorine. This solution which contained 1.05 moles of $\phi PCl_4$ was added at a rate of 100 ml. per hour to a rapidly agitated suspension of 2 moles of granular $NH_4Cl$ in 1 liter of symmetrical tetrachloroethane heated at a temperature of 144° C. After several hours the temperature dropped to 133° C. (due to the formation of trichloroethylene).

Hydrogen chloride was collected in aqueous NaOH. A Dry Ice trap was present to collect any condensables which were evolved along with the HCl. Within minutes after the reaction had begun a clear liquid began to collect in the trap. This was proven to be trichloroethylene by determination of boiling point, by infrared spectroscopy and vapor phase chromotography.

The reaction mixture was allowed to reflux several days until no more HCl was given off. The final reflux temperature was 127° C. During this time, 6.19 moles of HCl had been evolved (theoretical for production of phosphonitrilic products=4.20). The mixture was filtered to remove excess ammonium chloride and the filtrate was distilled through a fractionating column. A total of 2.11 moles of trichloroethylene was recovered in this manner before distillation of tetrachloroethane began (6.31 moles of HCl accounted for).

The solution was placed under reduced pressure and tetrachloroethane stripped off. This left 126 grams of the viscous oily product which was dissolved in benzene. Addition of petroleum ether and chilling produced 53.3 grams (32% yield) of crude 2,4,6,8-tetrachloro-2,4,6,8-tetraphenyltetraphosphonitrile, melting at 220–223° C. Further addition of petroleum ether to the filtrate produced 30 grams (18.3%) of crude trans-2,4,6-trichloro-2,4,6-triphenyltriphosphonitrile melting at 112–131° C. Repeated crystallization from benzene-petroleum ether raised the melting point to 155–157° C. Further evaporation of the filtrate gave 42 grams of oily linear $(\phi PNCl)_n$ which could not be recrystallized.

Example II

In a manner similar to that set forth in Example I solutions of $\phi PCl_4$ in chlorobenzene, 1,2,4-trichlorobenzene, bromobenzene and n-heptane were prepared. These solutions were then reacted at the reflux temperatures thereof with both granular (greater than 10 microns average particle size) and fine size (less than 10 microns average particle size) $NH_4Cl$. The concentration of $\phi PCl_4$ in the reaction mixture was also varied from run to run to show the effect thereof on production of trimer and tetramer. In all cases where the solvents of the present invention are used only the theoretical amount of HCl evolves from the reaction mixture. The results of these runs are tabulated below.

| Run | Solvent | Temp. (° C.) | Percent Theoretical HCl | NH₄Cl Particle Size (microns) | Maximum Conc φPCl₄ (moles/l.) | Percent Yield | |
|---|---|---|---|---|---|---|---|
| | | | | | | Trimer | Tetramer |
| 1 | Chlorobenzene | 131 | 99 | Granular¹ | 0.5 | 29.4 | 45.6 |
| 2 | ----do---- | 131 | 98 | Granular¹ | 10⁻⁴ | 45.0 | 22 |
| 3 | ----do---- | 131 | 98 | <10 | 10⁻⁴ | 89.0 | 11.0 |
| 4 | 1,2,4-trichlorobenzene | 130 | 99 | Granular¹ | 0.10 | 24.9 | 36.1 |
| 5 | ----do---- | 130 | 99 | ----do.¹ | 10⁻⁴ | 41.5 | 8.3 |
| 6 | ----do---- | 130 | 98 | <10 | 10⁻³ | 90.1 | 8.2 |
| 7 | Bromobenzene | 132 | 99 | Granular¹ | 1.7 | 37.1 | 16.2 |
| 8 | ----do---- | 132 | 98 | ----do.¹ | 10⁻⁴ | 40.2 | 13.5 |
| 9 | ----do---- | 132 | 97 | <10 | 10⁻⁴ | 88.6 | 11.1 |
| 10 | n-Heptane | 98 | 0 | Granular¹ | 0.1 | None | None |
| 11 | ----do---- | 98 | 0 | ----do.¹ | 10⁻² | None | None |
| 12 | ----do---- | 98 | 98 | <10 | 10⁻² | 80.1 | 5.6 |
| 13 | Sym-tetrachloroethane | 144 | 165 | Granular¹ | 0.7 | 18.3 | 32.0 |
| 14 | ----do---- | 144 | 125 | ----do.¹ | 10⁻⁴ | 30.0 | 20.1 |
| 15 | ----do---- | 144 | 126 | <10 | 10⁻⁴ | 29.2 | 30.1 |

¹ Average particle size=0.5 to 2 mm.

When the results of Example II using chlorobenzene as a reaction solvent are compared with Example I which used symmetrical tetrachloroethane as a reaction solvent, it is seen that the use of the presently disclosed solvents results in superior yields of phosphonitriles under similar reaction conditions.

We claim:
1. A method for preparing cyclic phosphonitrile compounds of the formula

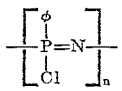

wherein $n$ has the values of 3 and 4 and $\phi$ is phenyl, which comprises reacting $\phi PCl_4$ and $NH_4Cl$ in the presence of a reaction medium selected from the group consisting of the compounds of the formulae

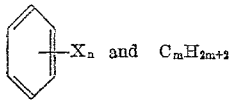

wherein X is selected from the group consisting of chlorine and bromine, $n$ has the value of from 1 to 3 and $m$ has a value of from 6 to 10 at a temperature of from about 60° to about 150° C., and recovering the trimers and tetramers formed.

2. The method of claim 1 wherein the medium is chlorobenzene.

3. The method of claim 1 wherein the medium is heptane.

4. The method of claim 1 wherein the trimers and tetramers are recovered by removing excess ammonium chloride from the reaction mixture, and recovering the trimer and tetramer from the mixture by distillation of the reaction medium.

References Cited by the Examiner

FOREIGN PATENTS 892,775  3/1962  Great Britain.

OTHER REFERENCES

Bezman: J. Am. Chem. Soc., volume 83, 1961, p. 2210.
Shaw et al.: J. Chem. Soc., 1962, pp. 5004–5009.

LORRAINE A. WEINBERGER, *Primary Examiner.*
BERNARD HELFIN, *Examiner.*